United States Patent
Linde et al.

[11] Patent Number: 5,961,710
[45] Date of Patent: Oct. 5, 1999

[54] INORGANIC PIGMENT GRANULES PROCESS FOR THEIR PRODUCTION AND THEIR USE

[75] Inventors: Günter Linde, Krefeld; Manfred Eitel, Kempen; Olaf Schmidt-Park, Krefeld; Kai Bütje, Duisburg, all of Germany

[73] Assignee: Bayer Aktiengesellschaft, Germany

[21] Appl. No.: 09/022,157

[22] Filed: Feb. 12, 1998

[30] Foreign Application Priority Data

Feb. 21, 1997 [DE] Germany ............ 197 06 899

[51] Int. Cl.⁶ ...................................... C09C 1/36
[52] U.S. Cl. ............... 106/437; 106/428; 106/429; 106/430; 106/433; 106/436; 106/438; 106/439; 106/440; 106/441; 106/442; 106/447; 106/450; 106/451; 106/452; 106/453; 106/459; 106/460; 106/472; 106/476; 106/479; 106/480; 106/499; 106/501.1
[58] Field of Search .................. 106/428, 429, 106/430, 436, 433, 437, 438, 439, 440, 441, 442, 447, 450, 451, 452, 453, 456, 459, 460, 472, 476, 479, 480, 499, 501.1

[56] References Cited

U.S. PATENT DOCUMENTS

| | | | |
|---|---|---|---|
| 4,946,505 | 8/1990 | Jungk | 106/712 |
| 5,199,986 | 4/1993 | Krockert et al. | 106/712 |
| 5,215,583 | 6/1993 | Krockert et al. | 106/712 |
| 5,389,137 | 2/1995 | Linde et al. | 106/281.1 |
| 5,484,481 | 1/1996 | Linde et al. | 106/712 |
| 5,634,970 | 6/1997 | Linde et al. | 106/437 |

FOREIGN PATENT DOCUMENTS

| | | |
|---|---|---|
| 0 257 423 | 3/1988 | European Pat. Off. |
| 0 365 046 | 4/1990 | European Pat. Off. |
| 0 507 046 | 10/1992 | European Pat. Off. |
| 42 14 195 C2 | 11/1993 | Germany |
| 43 36 613 | 2/1995 | Germany |
| 43 36 612 A1 | 5/1995 | Germany |
| WO 87/07595 | 12/1987 | WIPO |

OTHER PUBLICATIONS

Derwent abstract No. 1990–321620 of DE 3,918,694 C, Rademachers, J. Oct. 1990.

*Primary Examiner*—Mark L. Bell
*Assistant Examiner*—Scott L. Hertzog
*Attorney, Agent, or Firm*—Connolly & Hutz

[57] ABSTRACT

The invention relates to granules of inorganic pigments, a process for their production using several auxiliary substances by compacting and their use in many technical fields.

7 Claims, No Drawings

INORGANIC PIGMENT GRANULES PROCESS FOR THEIR PRODUCTION AND THEIR USE

BACKGROUND OF THE INVENTION

The present invention relates to granules of inorganic pigments, a process for their production using several auxiliary substances by compacting and their use in many technical fields.

Even in the case of mass products such as inorganic pigments, the use of pigment granules has greatly increased in the last few years for reasons of industrial hygiene, such as dustlessness and toxicity, and improved handling (flow and metering behavior). Spray and accretion granules are known. In spray granulation, spraying from aqueous suspension takes place, and in accretion granulation, accretion in mixers or on rotary tables, for example, with subsequent drying step. These procedures require a great deal of energy. Compacting processes as inexpensive ways of producing granules for mass products again require either high pressures or the use of binders, so that the granules obtained thereby are generally only suitable for specific fields of application such as in building materials or plastics or in emulsion paints.

Spray drying processes for producing granules to color concrete are based on pigment suspensions and use binders. Corresponding processes are described in various industrial rights. Water-soluble binders are used. Organic substances such as lignin sulphonates, formaldehyde condensates, gluconic acids and sulphated polyglycol ethers are used in DE-A-36 19 363, EP-A-0 268 645, U.S. Pat. No. 4,946,505 and EP-A-0 365 046, whereas inorganic salts such as silicate and phosphate are used according to DE-A-39 18 694 and U.S. Pat. No. 5,215,583. A combination of spray and accretion granulation is described in EP-A-0 507 046 (U.S. Pat. No. 5,199,986). DE-A-36 19 363 and EP-A-0 268 645 even expressly exclude compacting processes because too much coherence of the particles is achieved by the use of pressure so that although good transport stability of the granules is achieved, so also are reduced dispersing properties.

EP-A-0 257 423 and DE-A-38 41 848 describe spray granulation with the addition of polyorganosiloxanes as hydrophobic lipophilic additives. The spray dryer mentioned generally leads to small particle sizes, i.e. high fines. A substantial proportion of the material from the dryer cannot therefore be used directly as granules but must be retained as fines in a filter and returned to the process. In the case of spray-granulated products the hydrophobizing post-treatment leads to granules which flow very well but create an extraordinarily large amount of dust.

At high compressive forces, compacting or compression processes lead to granules which are stable but difficult to disperse, and at low compressive forces too much dust is created so that the yield is poor. This is countered by binders or dispersants which bring about both an improved adhesion of the pigment particles to each other and a repellent, stabilizing effect on incorporation into a particular medium such as concrete, asphalt, plastic or emulsion paints.

A process for coloring asphalt with inorganic pigment granules is known from DE-A-42 14 195 and U.S. Pat. No. 5,389,137 in which oils are used as binders. The granules are produced by means of a simple granulation process.

In DE-A-43 36 613 U.S. Pat. No. 5,634,970, U.S. Pat. No. 5,484,481 and DE-A-43 36 612, inorganic pigment granules are produced from pigments by mixing with binders, compacting, crushing and finally forming into granules. These granules have been optimized for use in plastics by means of hydrophobic binders and/or improved by addition of dispersants as far as aqueous systems are concerned.

Granules which were optimized for the individual field of use in question were produced by special production processes and with binders with specific properties.

SUMMARY OF THE INVENTION

The object of the invention was therefore to provide universally usable inorganic pigment granules and to be able to produce these granules from mass products, such as pigments, with a granulation process that is simple, inexpensive and easy to carry out so that these new products can be successfully used in various technical fields of application.

It has been possible to achieve this object by means of the granules according to the invention which are produced with special combinations of several auxiliary substances, and by means of a process for their production.

DETAILED DESCUPTION OF THE INVENTION

The invention provides inorganic compacted pigment granules with an average diameter of 50 to 1000 $\mu$m, preferably 100 to 800 $\mu$m, particularly preferably 100 to 700 $\mu$m, a bulk density of 0.2 to 1.8 g/cm$^3$, preferably 0.4 to 1.5 g/cm$^3$, and a water content of 3 wt. % maximum, related to pigment, consisting of the corresponding technical inorganic pigment powders and auxiliary substances from the following groups a) to c)

a) polyalkylene glycols with a molecular weight of <2000 and alkylene=ethylene or propylene,
b) lignin sulphonates and
c) cellulose ethers with a viscosity of <1000 mPa.s in 2 wt. % aqueous solution at 20° C., in a quantity of 0.1 to 4 wt. %, preferably 0.1 to 2 wt. %, per auxiliary substance, related to pigment, wherein the total quantity of auxiliary substances should not exceed 5 wt. %, preferably 2 to 4 wt. %, and wherein at least two and no more than three auxiliary substances are from different groups.

Iron oxides, titanium dioxide, chromium oxide, bismuth vanadate, rutile mixed phase pigments and carbon black are preferably used as technical inorganic pigment powders.

Particularly good inorganic pigment granules are obtained if at least one of the auxiliary substances is present in liquid form.

Cellulose ethers with a viscosity of <500 mPa.s in 2 wt. % aqueous solution at 20° C. are particularly preferred.

Polyethylene glycol in combination with lignin sulphonate, preferably ammonium lignin sulphonate, and carboxymethylcellulose or its alkali metal salts are particularly preferably used.

The paired combinations of lignin sulphonate and polyethylene glycol and/or of carboxymethylcellulose and polyethylene glycol as auxiliary substances are particularly preferred.

The inorganic compacted pigment granules according to the invention may be used in all technical fields of application for coloring purposes. Fields of application which may be mentioned are the coloring of building materials, particularly concrete and plasters, lacquers, plastics, paper and asphalt as well as use in emulsion paints.

The invention also provides a process for producing the inorganic compacted pigment granules according to the invention which is characterized in that a) one or more pigment powders are mixed with auxiliary substances from groups a) to c)

a) polyalkylene glycols with a molecular weight of <2000 and alkylene=ethylene or propylene,
b) lignin sulphonates and
c) cellulose ethers with a viscosity of <1000 mPa.s in 2 wt. % aqueous solution at 20 ° C.,
  wherein at least two and no more than three auxiliary substances are from different groups, in a quantity of 0.1 to 4 wt. % per auxiliary substance, related to pigment,
b) this mixture is subjected to a compression or briquetting step,
c) this compressed or briquetted product is crushed,
d) the crushed product is separated into two or more fractions,
e) the fraction in which at least 85% of the particles are larger than 50 μm, preferably larger than 100 μm, or lie between 50 and 1000 μm, preferably between 100 and 1000 μm, is removed as product and optionally rounded in a further step and the other fraction and/or the other fractions are expelled from the process or returned.

The compacting process according to the invention with crushing and selection of the suitable particle size range by separation and/or deformation is an inexpensive process which is easy to use for granulating pulverulent inorganic pigments particularly when high throughputs of 0.5 to 5 t/h are involved. With the process according to the invention, a sufficiently transport-stable granule with good meterability and good dispersibility is obtained at low to moderate pressures. The use of the specific binder combinations additionally has a positive influence on the properties of the granules (adhesive forces and coherence of the powder). Furthermore, the re-dispersing of the granules which are produced with the corresponding binder combinations is very good on incorporation.

In a particularly preferred embodiment, at least one liquid auxiliary substance and/or one auxiliary substance in liquid form is used. By this measure the adhesive forces may be additionally utilized by means of liquid bridges.

Virtually dustless granules are obtained by means of the compacting process according to the invention at moderate compressive forces (e.g. 0.1 kN/cm to 15 kN/cm on a roll compactor with a roll diameter of 20 cm). Crushing may be carried out for example via screen granulators with a corresponding screen mesh width. The granules may also be separated into different fractions via screens. The smallest possible particles with the narrowest possible grain size spectrum are sought because of the better processability.

The pigment granules according to the invention exhibit a good relative color strength and in suspension a good viscosity, generate virtually no screen residue when re-dispersed in suspension and exhibit good settling behavior (adequate stability of the suspension produced with the granules according to the invention). Foaming, which is frequently observed when granules are stirred into liquids or suspensions, does not occur when the granules according to the invention are used.

The invention will now be described in greater detail with the aid of the examples which follow.

Dispersibility in plastics was tested according to a specification which approximates to DIN 53 775, Part 7: "Testing of coloring agents in plasticized polyvinyl chloride (PVC-P) moulding compositions; determination of dispersion hardness by roll mill":

The pigment under test was dispersed in PVC at 160±5° C. on a mixing mill. The rolled sheet obtained was divided and one half then exposed to elevated shear forces at room temperature by rolling. In the case of colored pigments the criterion for dispersibility is the color distance ΔE according to CIELAB (DIN 5033, 6174) between hot and cold-rolled PVC sheet, and in the case of white pigments the difference in the standard color coordinates Y (DIN 5033) between hot and cold-rolled PVC sheet. A pigment which disperses well is already fully dispersed at low shear forces, whereas a pigment which is difficult to disperse requires the elevated shear forces on rolling at low temperature to disperse fully. Therefore: the smaller the color distance ΔE and/or the difference between the standard color coordinates Y, the better the pigment can be dispersed. Dispersibility is very important in the case of granules in particular because the granule particles which are then to be dispersed in the plastic must first be reduced. For granules the aim is dispersibility that is as good as that of the corresponding pigment powders so that the parameters ΔE and/or Y should not differ substantially for powder and granule.

A ΔE of <1.0 units means well dispersible, a ΔE of 1 to 2 units satisfactorily dispersible.

The dispersibility test for building materials took place in cement mortar via the colour strength measurement of prisms made of white cement, with the following data: Cement/quartz sand ratio 1:4, water/cement value 0.35, pigmenting level 1.2% related to cement, RK Toni Technik, Berlin, mixer used, with 5 l mixing pan, type 1551, speed 140 rpm, batch: 500 g of cement.

Three mixture samples (300 g) were taken after 100 seconds and test bodies (5×10×2.5 cm) produced under pressure (300 bars). Setting of test bodies: 24 hours at 30° C. and 95% relative humidity with subsequent drying for four hours at 60° C. Color data measurement via Dataflash 2000, Datacolor International, Cologne, 4 measurement points per brick, 12 measurement points per pigment mixture. The mean values obtained were compared with the values of a reference sample. Color distance $E_{ab}$ and color strength (reference sample=100%) (DIN 5033, DIN 6174) were assessed. Dispersibility was adjudged good at a color strength difference up to 5% with respect to the reference sample, and as satisfactory at a difference up to 10%.

The process used to test dispersibility in asphalt was as follows: the pigment/pigment granule was mixed in a heatable laboratory mixer (Rego mixer) together with a road bitumen of type B 80 (commercial product of Shell AG) and aggregates for 60 seconds at 180° C. Test bodies according to Marshall ("The Shell Bitumen Handbook", Shell Bitumen UK, 1990, pp. 230–232) were produced with the mixture. Color shade differences were assessed (Minolta Chromameter II, standard illuminant C, Cielab system, DIN 5033, DIN 6174) by comparing the red values a* with a reference test body with pigment powder. Differences in the a* values which are smaller than 0.5 units cannot be visually distinguished.

Flow behavior was tested by assessing the outflow behavior from a funnel of 100 ml volume and a 6 mm opening by analogy with ASTM Test D 1200-88. The flow behavior was assessed as very good when the material flows out freely. If the granule flows after one knock, the flow behavior was assessed as good, if it only flows after several knocks the flow behavior was deemed to be moderate.

Screen analyses were carried out on a VA screen to DIN 4188 with 250 μm and 800 μm mesh width on a Rhewum LPS 200 MC type compressed-air screening machine. Approx. 20 g of the sample under test were used. The fines were extracted for 1 minute and the amount of coarse material on the screen weighed.

The screen residue and the viscosity of an aqueous iron oxide suspension were determined as follows:

600 g of the pigment under test were incorporated into 400 g of water by laboratory dissolver at 2500 to 3000 rpm (dissolver disc dia. 35 mm). Further dispersion then took place for 5 minutes at 2500 to 3000 rpm. The screen residue was then determined as follows:

200 g of the suspension were transferred to a 45 μm test screen. Washing then took place with a water jet that was not too fast-flowing, until the water draining off was no longer turbid. The residue was dried for 1 hour at 105° C. and weighed. The viscosity was determined with a Brookfield viscometer.

To determine settling behavior, 200 g of the pigment granule under test were incorporated into 200 g of water at 800 to 1000 rpm using a laboratory stirrer (propeller stirrer dia. 40 mm) and further dispersed for 10 minutes at 800 to 1000 rpm. A 100 ml measuring cylinder was then filled with the suspension and read off every day. The volume of the supernatant solution was noted.

EXAMPLE 50 kg of iron oxide pigment (Bayferrox® 130; commercial product of Bayer AG) are placed in a mixer, the corresponding additive added and mixed for 15 minutes. The mixture is then compacted with a compressive force (1.3 and/or 4 kN/cm) at constant roll speed using a type L200/50 P roll compactor from Bepex (Leingarten).

Feed to the compactor is by means of metering screw so as to ensure a constant product feed. The flakes produced are crushed using an MGI-314 type crusher made by Frewitt (Fribourg, Switzerland). The crushed material was then screened through a screen (300 μm mesh width). Feed onto the screen was by means of a vibrating chute at approx. 40 kg/hr.

The resulting granule has a particle size of 300 to 1000 μm, with an average content of 60–90% for particles between 300 and 800 μm.

The properties of the granules can be seen in the Tables which follow.

TABLE 1

| Test No. | 1 wt. % addition in each case | Granules >300 mm [%] | Screen analysis [wt. %] | | | Flow time [s] |
|---|---|---|---|---|---|---|
| | | | 0–250 mm | 250–800 mm | >800 mm | |
| 1 | Powder | — | — | — | — | does not flow |
| 2 | no addition | 61.9 | 12.7 | 76.2 | 11.1 | 33 moderate |
| 3 | PEG 400 | 58.1 | 4.0 | 84.3 | 11.7 | 29 moderate |
| 4 | Walocel CRT 30 P | 47.9 | 10.6 | 86.0 | 3.4 flow | does not |
| 5 | PEG 400 Wanim AM Walocel CRT 1,000P | 66.7 | 8.4 | 81.4 | 10.2 moderate | 30 |
| 6 | PEG 400 Walocel CRT 30P | 60.5 | 2.3 | 88.3 | 10.4 good | 30 |
| 7 | PEG 400 Walocel VPC 32104P Wanim AM | 58.3 | 12.3 | 87.7 | 8.6 moderate | 31 |
| 8 | PEG 400 Walocel CRT 30P Wanim AM | 55.5 | 6.4 | 83.4 | 10.2 good | 31 |

| Test No. | Liquefaction (60% solids) | | Dispers. in bldg. mat'l rel. color strength [%] | Settling behavior (50% suspension) [ml] | | Dispers. in asphalt Da* | Dispers. in plastic, hot/cold roll test DE |
|---|---|---|---|---|---|---|---|
| | Visc. [mPa*s] | Screen residue [%] | Foaming | | Day 1 | Day 5 | | |
| 1 | 970 | 0.0 | no | 100 | 86 | 86 | 0.0 | 0.6 |
| 2 | 390 | 0.0 | no | 95 | ca. 90* | ca. 90* | 0.0 | 0.7 |
| 3 | 220 | 0.0 | no | 96 | ca. 80* | ca. 90* | — | — |
| 4 | 350 | 0.2 | no | 98 | 9.5 | 26 | — | — |
| 5 | >2000 | 0.0 | no | 100 | — | — | — | — |
| 6 | 340 | 0.2 | no | 99 | 3 | 17 | 0.3 | 0.3 |
| 7 | 600 | 0.0 | no | 101 | — | — | — | — |
| 8 | 460 | 0.5 | no | 98 | 3 | 8.5 | 0.1 | 0.5 |

Compressive force: 1.3 kN/cm
Wanim AM - ammonium lignin sulphonate, commercial produkt of Lignotech
Walocel CRT 30P - carboxymethylcellulose, viscosity: 30 mPa*s in 2% aqueous solution at 20° C. according to Haake (Typ ® Rotovisko RV 100), commercial product of Wolff Walsrode AG
PEG 400 - polyethylene glycol, molecular weight 400, commercial produkt of Hoechst AG
Walocel CRT 1000P-carboxymethylcellulose, Viscosity: 1000 mPa*s in 2% aqueous solution at 20° C. according to Haake (Typ ® Rotovisko RV 100), product of Wolff Walsrode AG
Walocel VPC 32104 P-carboxymethylcellulose, Viscosity: 5 mPa*s in 2% aqueous solution at 20° C. according to Haake (Typ ® Rotovisko RV 100), product of Wolff Walsrode AG
*supernatant phase highly turbid, sediment formation

TABLE 2

| Test No. | 1 wt. % addition in each case | Granules >300 mm [%] | Screen analysis [wt. %] 0–250 mm | Screen analysis [wt. %] 250–800 mm | Screen analysis [wt. %] >800 mm | Flow time [sec.] | Liquefaction (60%) solids Visc. [mPa*s] | Liquefaction (60%) solids Screen residue [%] | Foaming | Dispers. in bldg mat'l rel. color strength [%] | Dispers. in asphalt Da* | Dispers. in plastic, hot/cold roll test DE |
|---|---|---|---|---|---|---|---|---|---|---|---|---|
| 1 | Powder | — | — | — | — | does not flow | 970 | 0.0 | no | 100 reference | 0.0 reference | 0.6 |
| 2 | no addition | 65.3 | 10.0 | 73.6 | 16.4 | 30 moderate | 700 | 0.0 | no | 84 | — | — |
| 3 | Wanin AM | 70.5 | 3.3 | 81.5 | 15.2 | 29 moderate | 360 | 0.5 | no | 84 | — | — |
| 4 | PEG 400 Wanin AM | 71.4 | 2.6 | 72.9 | 24.5 | 29 good | 300 — | 0.2 | no | 91 | — | — |
| 5 | PEG 400 Walocel CRT 30P Wanin AM | 69.6 | 4.9 | 77.9 | 17.2 | 28 good | 520 | 0.0 | no | 93 | 0.4 | 0.2 |

Compressive force: 4 kN/cm
Wanin AM - see Table 1
Walocel CRT 30P - see Table 1
PEG 400 - see Table 1.

We claim:

1. Inorganic compacted pigment granules with an average diameter of 50 to 1000 µm, a water content of 3 wt. % maximum, related to pigment, and a bulk density of 0.2 to 1.8 g/cm$^3$ consisting of inorganic pigment powders and auxiliary substances selected from the group consisting of mixtures of polyalkylene glycols with a molecular weight of <2000 wherein alkylene is ethylene or propylene, lignin sulphonates and cellulose ethers with a viscosity of <1000 mPa.s in 2 wt. % aqueous solution at 20° C., in a quantity of 0.1 to 4 wt. % per auxiliary substance, related to pigment, wherein the total quantity of auxiliary substances does not exceed 5 wt. % and wherein at least two and no more than three auxiliary substances are from different groups.

2. Inorganic pigment granules according to claim 1, wherein the inorganic pigment powders are selected from the group consisting of iron oxides, titanium dioxide, chromium oxide, bismuth vanadate, rutile mixed phase pigments and carbon black.

3. Inorganic pigment granules according to claim 1, wherein at least one of the auxiliary substances is present in liquid form.

4. Inorganic pigment granules according to claim 1, wherein polyethylene glycol, lignin sulphonate and carboxymethylcellulose are present as auxiliary substances.

5. Inorganic pigment granules according to claim 1, wherein lignin sulphonate and polyethylene glycol are present as auxiliary substances.

6. Inorganic pigment granules according to claim 1, wherein carboxymethylcellulose and polyethylene glycol are present as auxiliary substances.

7. Process for producing inorganic compacted pigment granules comprising the steps of mixing at least one pigment powder with auxiliary substances selected from the group consisting of mixtures of polyalkylene glycols with a molecular weight of <2000 wherein alkylene is ethylene or propylene, lignin sulphonates, and cellulose ethers with a viscosity of <1000 mPa.s in 2 wt. % aqueous solution at 20° C., wherein at least two and no more than three auxiliary substances are from different groups, in a quantity of 0.1 to 4 wt. % per auxiliary substance, related to pigment, compressing or briquetting the mixture, crushing the compressed or briquetted product, separating the crushed product into two or more fractions, removing one fraction as product in which at least 85% of the particles are larger than 50 µm or lie between 50 and 1000 µm, and expelling or recycling the other fraction and/or fractions from the process.

* * * * *

UNITED STATES PATENT AND TRADEMARK OFFICE
CERTIFICATE OF CORRECTION

PATENT NO. : 5,961,710
DATED : October 5, 1999
INVENTOR(S) : Gunter Linde, et al.

It is certified that error appears in the above-identified patent and that said Letters Patent is hereby corrected as shown below:

Column 6, in TABLE I, under the " >800 mm" Column, "flow", "moderate", "good", "moderate" and "good" should be moved to read under the column "Flow time [s]".

Signed and Sealed this

Sixth Day of March, 2001

Attest:

NICHOLAS P. GODICI

Attesting Officer

Acting Director of the United States Patent and Trademark Office